(12) United States Patent
Richie et al.

(10) Patent No.: US 9,510,215 B1
(45) Date of Patent: Nov. 29, 2016

(54) SMART ANTENNA METHOD

(71) Applicants: Diane Richie, Winter Park, FL (US);
Peter McCarthy, Orlando, FL (US);
David Kotick, Orlando, FL (US)

(72) Inventors: Diane Richie, Winter Park, FL (US);
Peter McCarthy, Orlando, FL (US);
David Kotick, Orlando, FL (US)

(73) Assignee: The United States of America as represented by the secretary of the Navy, Washington, DC (US)

( * ) Notice: Subject to any disclaimer, the term of this patent is extended or adjusted under 35 U.S.C. 154(b) by 0 days.

(21) Appl. No.: 14/972,249

(22) Filed: Dec. 17, 2015

(51) Int. Cl.
*H04B 15/00* (2006.01)
*H04W 24/02* (2009.01)
*H04B 17/382* (2015.01)
*H04B 17/345* (2015.01)

(52) U.S. Cl.
CPC ............ *H04W 24/02* (2013.01); *H04B 15/00* (2013.01); *H04B 17/345* (2015.01); *H04B 17/382* (2015.01)

(58) Field of Classification Search
CPC ..................................................... H04W 24/02
USPC ............. 455/63.3, 63.1, 575.7; 375/260, 267
See application file for complete search history.

(56) References Cited

U.S. PATENT DOCUMENTS

2006/0166628 A1* 7/2006 Anttila ............... H01Q 1/28
455/101

OTHER PUBLICATIONS

Mawrey, Robert S. Radio Frequency Interference and Antenna Sites. How much spacing do you really need between antennas at radio sites? Unisite.Feb. 1, 2001.pp. 1-10.*

* cited by examiner

*Primary Examiner* — Nay A Maung
*Assistant Examiner* — Angelica M Perez
(74) *Attorney, Agent, or Firm* — Mark O. Glut; NAWCAD

(57) ABSTRACT

An automated, computational, software tool for adaptable, real-time configuration of Live to Virtual (L-V) tactical communications for continuous training environments. In these types of cosite environments, this tool de-conflicts mutual interfering frequencies of antenna pairs against required antenna isolation, thus eliminating the need for expensive couplers and frequency confining tunable filters.

3 Claims, 10 Drawing Sheets

Bipartite Graph: All Allowed Connections Prior to Assignment

Table with all "A" Pair Combinations for Set "A" equal to 5 elements

|    | A1  | A2  | A3  | A4  | A5  |
|----|-----|-----|-----|-----|-----|
| A1 |     | 2-1 | 3-1 | 4-1 | 5-1 |
| A2 | 1-2 |     | 3-2 | 4-2 | 5-2 |
| A3 | 1-3 | 2-3 |     | 4-3 | 5-3 |
| A4 | 1-4 | 2-4 | 3-4 |     | 5-4 |
| A5 | 1-5 | 2-5 | 3-5 | 4-5 |     |

Figure 6-7: Example-Best Assignment (3 empty cells)

SMART ANTENNA METHOD

STATEMENT OF GOVERNMENT INTEREST

The invention described herein may be manufactured and used by or for the Government of the United States of America for governmental purposes without payment of any royalties thereon or therefore.

BACKGROUND

The present invention provides an improved solution for co-site antenna interference during live tactical communications of Fleet Synthetic Training (FST) and the like.

FST events are computer assisted warfare exercises provided to help users master the tactical and warfighting skills required when deployed in various combat scenarios. The scenarios vary in geography, terrain, situational distance, etc. During synthetic training exercises, event coordinators send real-time data to communication systems and combatant stations initiating realistic missions and creating tactical problems which are executed in the Live, Virtual and Constructive (LVC) domain. Force responses and reactions are captured and recorded for after-action review and assessment. During synthetic exercises players on the training range communicate with a relay tower which connects them to a training network, as shown in FIG. 1. With this configuration, the capability is provided that allows live players to interact with geographically separated players, and support a unified, training environment in an integrated, and virtual battle space enabled by the network backbone of distributed training.

The relay tower is the communication bridge that performs the transition between Live-to-Virtual (L-V) tactical communication domains in synthetic training environments. The player on the training range uses a tactical radio to communicate with another trainee on a virtual radio through the relay to as shown in FIG. 2. The relay tower allows many players in the live domain, spread over a large area on the training range, a single access point to the training network. In order to be an effective communication bridge that handles multiple tactical nets, the relay tower is installed with multiple radios and antennas that connect to the network to establish communications with the virtual radio system. To complete the live communication link with the tactical field radio, the radio and antenna in the relay tower transmit and receive over a Radio Frequency (RF). Consequently, for the synthetic training to be successful, the communication segment must be transparent to the users (perform realistically), connect radios in the live domain to virtual radios, and provide the required number of frequency nets to support different types and sizes of distributed training exercises.

Difficulties with live communication segments are often experienced during many distributed training events. These problems have surfaced as degraded voice transmissions, increased static during transmissions, and blocked or dropped transmissions. When problems occur with the live communication segment, participation of trainees in the live domain of synthetic training exercises may be reduced by unintelligible or completely blocked tactical communication. This effect may result in a change of the tactical response of the trainees and therefore the outcome of the training exercises thereby making the communications in the live communication segment of the distributed training unreliable. A major cause of problems in the live communication segment of distributed training has been traced to cosite interference which occurs during multiple, simultaneous transmit and receive communications with the relay tower.

Cosite interference is unintentional, mutual interference, usually from multiple in-band, active radio communication paths and typically occurs when communication equipment is in close proximity to a shared platform, such as a communication tower or relay tower. As the physical separation between antennas decreases, cosite interference becomes more probable and significant. Interference of tactical communications is significantly increased when communication equipment is in close proximity, for example co-location of radios and antennas on a common platform such as a relay tower as shown in FIG. 3. During simultaneous communications, the off-channel signal power from a transmitting antenna is much stronger than the on-channel signal power received from a trainee out on the range. Consequently, a large number of radios and antennas occupying a shared platform may cause cosite interference, where the transmission of one signal degrades the reception of another signal resulting in static, broken voice or, in severe instances, completely blocked reception of other tactical communications. These complications are not replicated as encountered in real-world deployment and can interfere with valid training conditions. These types of technical issues have the potential to interfere and disrupt synthetic training events and training objectives.

The fundamental cause of cosite interference is the performance limitations of the radio including the inability of the radio to transmit a signal while simultaneously receiving a signal without limitations, which generally fall into three categories: noise, non-linearity products, and image frequency. The degradation in communication is most often directly related to the distances between the relay tower and the trainees in the field. This issue is referred to as the near-far problem. At the receiver input, the signal strength of the off-channel interfering transmit signal, which is near, is stronger than the on-channel receiver signal from the trainee in the field which is further away. The receiver must process the difference in signal power between the off channel, interfering signal and the on-channel Signal of Interest (SOI). Cosite interference occurs when the signal power ratio of the interference channel SOI exceeds the operating capability of the receiver. The extent of the near-far problem on the communication link is directly tied to two main factors, the range requirements for the training site and the frequencies of the interfering and on-channel signals. FIG. 4 is a graphical sketch of the near-far problem. For transmissions that are a larger distance from the relay tower, the signal-to-interference power ratios are larger (>) and for transmissions that are a shorter distance from the relay tower, the signal-to-noise power ratio is less (<). Cosite interference results when the relay radio is unable to process signal power ratios that are present at the antenna input to the radio. Therefore, it is imperative to isolate antennas to reduce the signal power of the interference signal, which will reduce the negative effects of the near-far problem.

Currently, many relay towers on training ranges use systems that allow assignment of frequency nets to antenna arrays with little or no guidance. Without the incorporation of rules and restrictions, communication hardware implementation must be capable of operating under all assignment conditions to guarantee high quality communication links. Without direction, any combination of resources is possible and the relay tower design is forced to incorporate worst case conditions, i.e. minimum antenna isolation for minimum channel spacing.

Consequently, with no controls in place to isolate antennas, any combination of antennas is possible. That is, without analytical modeling and simulation of the factors that contribute to poor communication link performance, the live communication segment of synthetic training may simply not function. Degraded unreliable or broken tactical communication links may then cause disruptions during training in a distributed exercise. By performing calculations that take into account components of cosite interference tactical communication problems are identified before they occur. Since the quality of a communication net varies for each frequency pair and antenna isolation varies for each antenna pair the assignment of antenna pairs with the most isolation to frequency pairs aids to avert the problem. The challenge is that as the number of radio-antenna combinations increases, the number of possible assignment combinations becomes extremely large. Therefore what is needed is a solution that determines frequency antenna assignments and results in added isolation to supplement radio capabilities and balance range requirements.

SUMMARY

This invention is automated method for using modeled or measured antenna isolation data and applying antenna isolation as a possible solution to predicted interference problems experienced in the communication segment. The method here is referred to as a smart antenna.

Antenna isolation between antenna elements is not a constant and varies as a function of antenna gain, distance between antenna elements, frequency, and antenna assignment. The performance of the radio at the relay tower also varies as a function of frequency and signal power ratio in the presence of multiple signals. The smart antenna method matches antenna isolation to radio performance to balance range coverage requirements. The number of possible combinations for connecting frequency nets to antennas can be extremely large. For example, the number of combinations for an equal number of "n" number of frequency nets and "n" number of antennas is equal to "n factorial" (where the mathematical expression is n!). Therefore, the development of the method is based on a scientific approach.

The current invention models noise, nonlinearities, and image frequency to determine the susceptibility of the relay tower to interference. It then models the isolation between antenna elements for mapping to problem frequency sets. Then, with this method, field data is collected on antenna arrays to be used as verification for modeled isolation between antenna elements.

First, the radio performance specifications are entered into a radio specification library and stored in a database. For each training site, the performance of the radio is calculated based on radio specifications from this library. Antenna isolation calculations are based on antenna specifications entered into an antenna specification library which is also stored in the database. Both the radio specification library and the antenna specification library are controlled and accessed by remote interface control (RIC), a software tool that allows remote configuration of radios in a communication tower. Once a list of operating frequencies has been entered into the RIC, the smart antenna manages relay tower resources by assigning frequency nets to antenna elements to close a deficient operational margin, on-site and in real time. The frequency-antenna is then passed from the smart antenna to the RIC for remote control and configuration.

Consequently, using modeling and simulation, the smart antenna determines antenna assignments that add isolation to supplement radio capabilities and balance training range requirements. Thus the smart algorithm reduces and often eliminates interference in the relay tower for predicted problem frequencies and improves tactical communication performance in LVC training environments.

DRAWINGS

FIG. 5 is a graph of allowed antenna-frequency connections prior to assignment.

FIG. 7 is a table containing all possible frequency-antenna connection combinations.

FIG. 8 is a table showing unassigned vertices and valid edges.

FIG. 9 is an example of a best assignment of antenna-frequency pairs.

FIG. 10 is a table showing an alternate embodiment of node assignment.

DESCRIPTION

In the following description of the present invention, reference will be made to various embodiments which are not meant to be all inclusive. The current invention can be implemented using software in a variety of simulation systems, synthetic training exercises, Live, Virtual, and Constructive (LVC) domains and the like.

The preferred embodiments of the present invention are illustrated by way of example and in FIGS. 1-11.

The smart antenna method starts by mathematically modeling all possible antenna-frequency connections prior to assignment. Given "M" number of vertices (nodes) in set A, representing the set of antennas and "N" number of vertices in set F, representing the set of frequencies, a set of equations mathematically models the assignment solution defined by the rule set. The rule set provides a solution that attempts an assignment resulting in the maximum number of valid edges between vertices of set F to vertices of set A. A valid edge is represented by a "1" with and invalid edge represent by a "0" or "blank."

The bipartite graph that contains the two sets, Set A and Set F is shown graphically in FIG. 5. Both set A and set F contain n=5 vertices (nodes). The bipartite graph in FIG. 5 demonstrates the allowed connections, also referred to as edges, between Set A and Set F prior to assignment. In order for the smart antenna to make a valid edge assignment, the following rules are applied:

Rule #1: A vertex in one set can only connect to a vertex in another set.
Rule #2: A vertex cannot connect to itself.
Rule #3: Edges between vertices residing in the same set are not allowed.
Rule #4: Once an edge connects a vertex pair, the two vertices cannot connect to any other vertex.

In addition, each frequency (F) vertex may require additional isolation between itself and every other F vertex. Also, the degradation between F vertices is not commutative. This also holds true for A vertices. The isolation between the A vertices is dependent on F.

In the example graph shown in FIG. 5, there are 120 possible combinations of connecting nodes in Set A to nodes in Set F. It follows that the number of combinations grows as a function of "n" factorial (n!) with increasing number of vertices. Consequently, at some number "n" it is impossible to check all possible combinations for a correct solution in real time. In fact, when the number n is very large, there are so many possible combinations that not all combinations can be checked.

Figure 1:
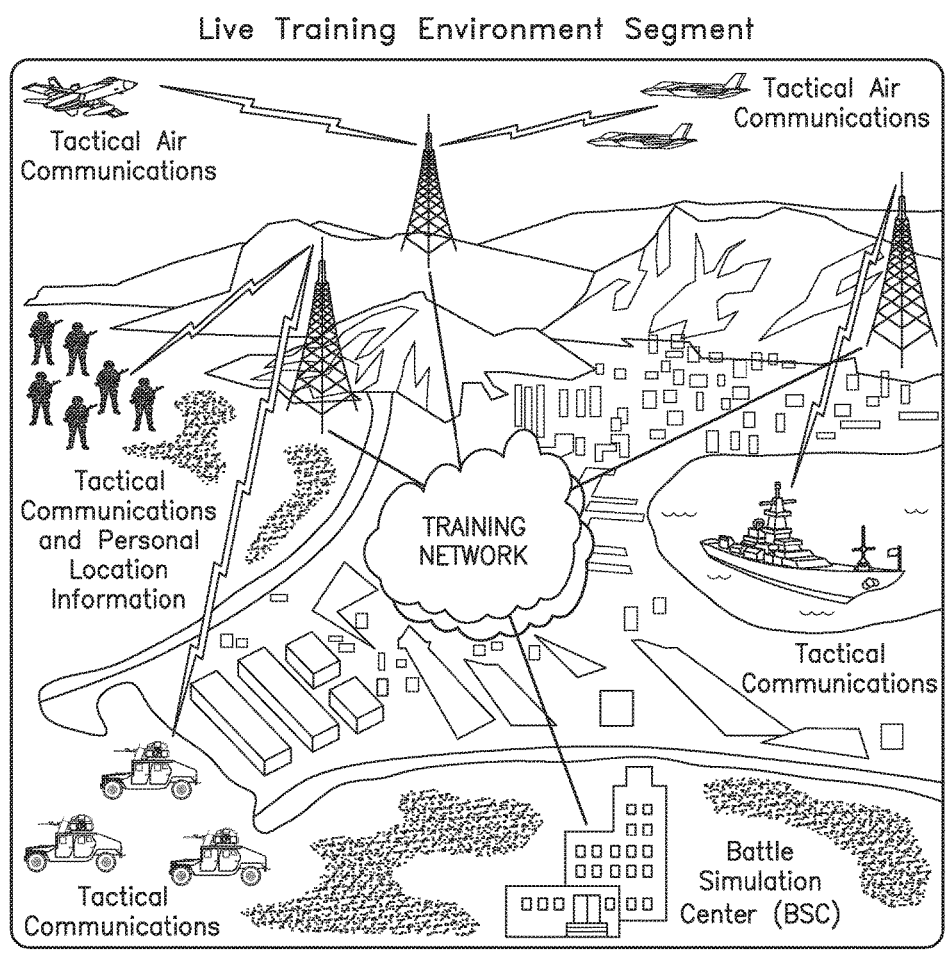
FIG. 1 is depiction of the LVC training environment.
Figure 2:
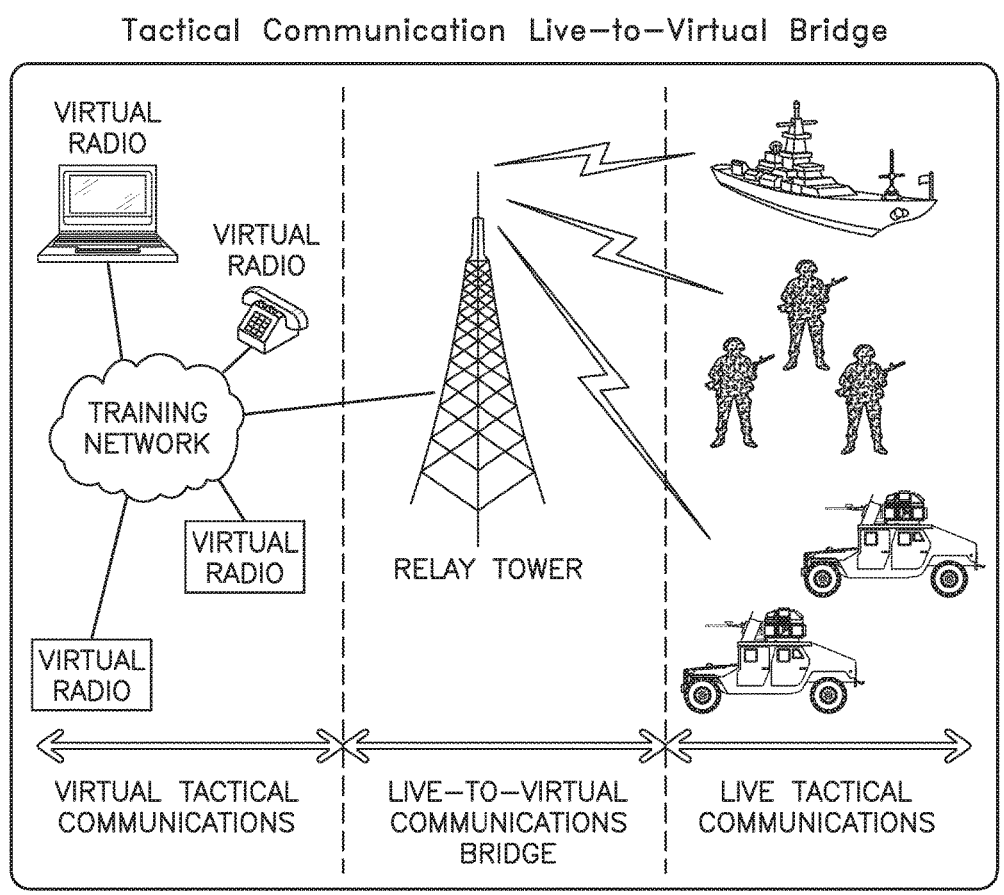
FIG. 2 is depiction of the tactical communication live-to-virtual bridge.
Figure 3:
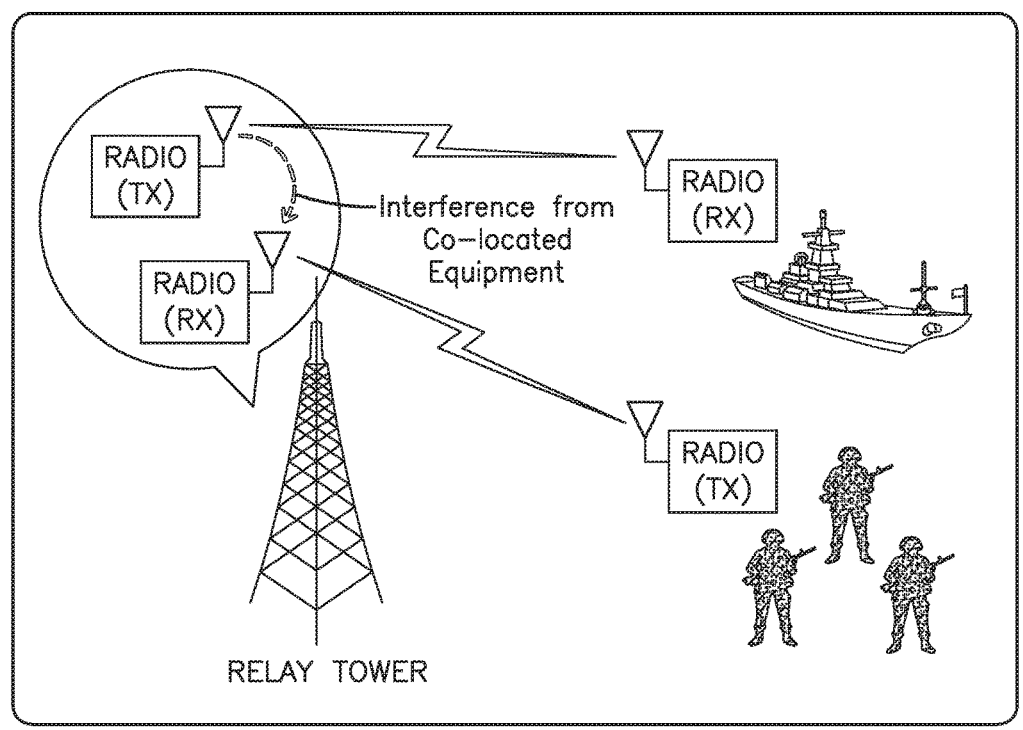
FIG. 3 shows the interference from co-located equipment in a relay tower.
Figure 4:
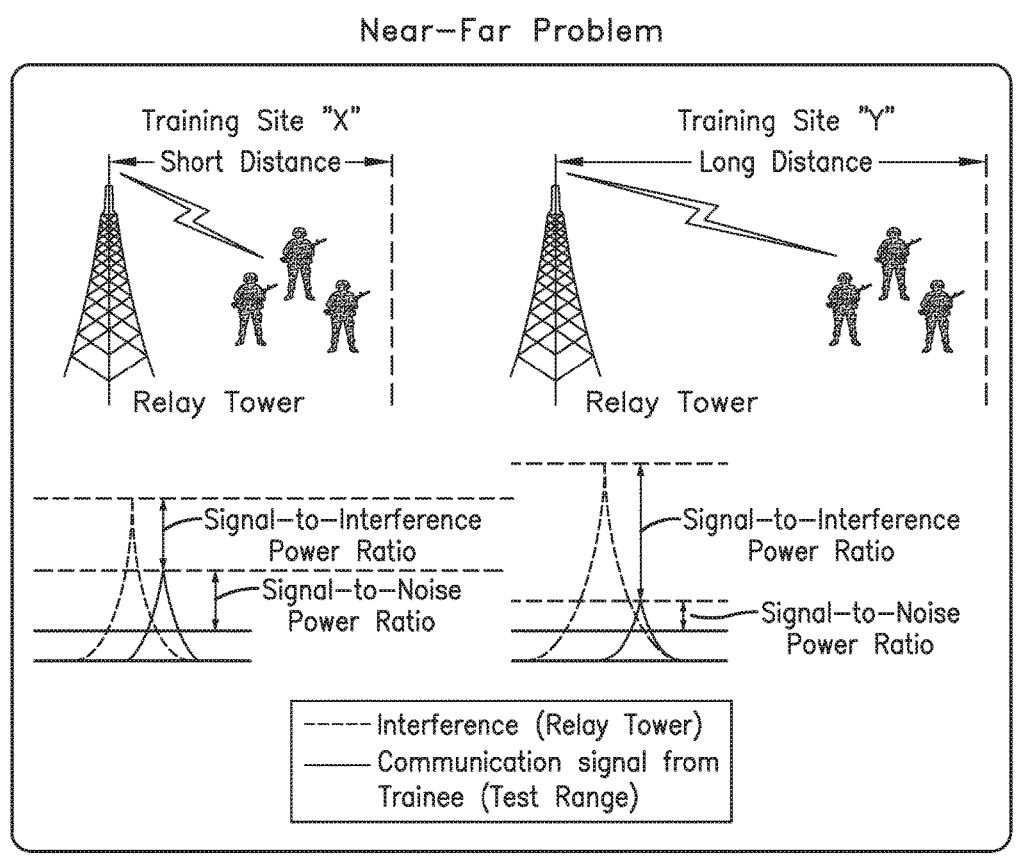
FIG. 4 is a graphical representation of the near-far problem.
Figure 6:
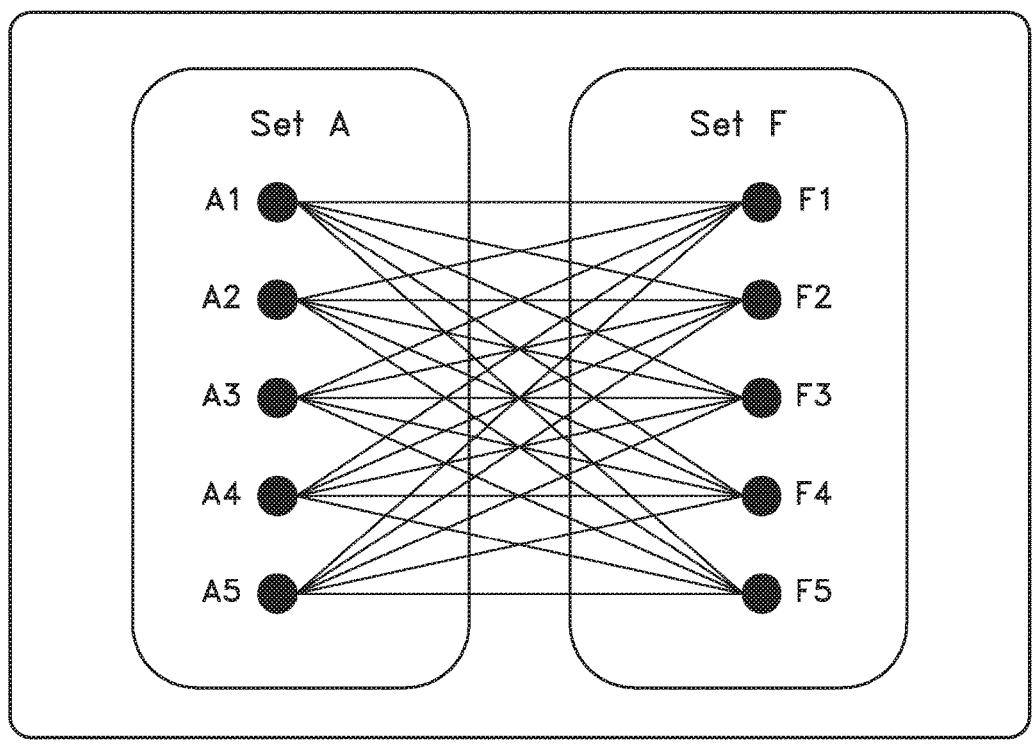
FIG. 6 is a table with all "A" pair combinations for set "A" equal to 5 elements.
Figure 7:
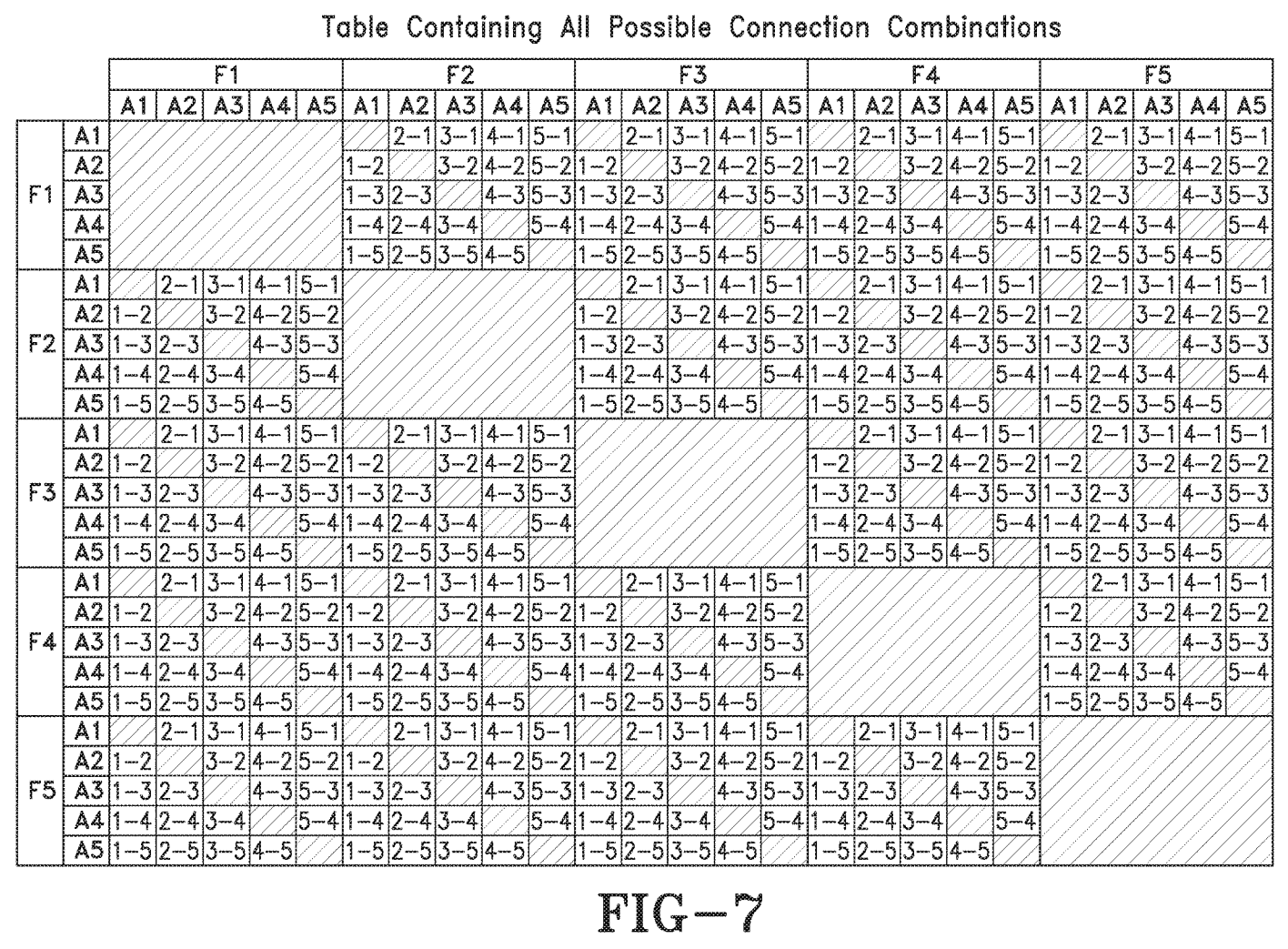

The possible vertex pairs for set A are shown in FIG. 6. The convention used for specifying a cell in the matrix leads with the nomenclature in the top row. For example, the circled cell in FIG. 6 identified as column A2- row A1 and 2-1 is entered into the cell as an abbreviation. The naming standard applies to pairs in Set A and Set F. The table for all "A" pair combinations in FIG. 6 is entered into each "F" vertex pair combination as shown in FIG. 7. FIG. 7 is the composite of all possible assignment combinations prior to making the first assignment between Set A and Set F. Pursuant to Rule #2, a vertex cannot be connected to itself. Therefore, all cells that are $F_{i,i}$ or $A_{jj}$ are represented by empty cells. Merely assigning a frequency to an antenna is a two-dimensional weight matrix. However, the problem of cosite interference occurs with simultaneous transmit-receive communications. Therefore, the solution to the problem is finding an antenna pair with enough isolation for each transmit-receive frequency pair. The dependency on pairs is a four-dimensional weight matrix as shown in the table of FIG. 7.

For each F vertex pair there is a known degradation. Degradation may vary between each F vertex pair combination, e.g. degradation for F2-F1 may differ from the amount of degradation for F2-F3, F1-F2, etc. For each vertex pair there is a known isolation. Likewise, isolation varies for each A vertex pair combination as a function of the frequency of the vertex pair. If the isolation for a specified A vertex pair is less than the degradation for a corresponding F vertex pair then the A vertex pair does not contain a valid edge for the F vertex pair and is represented by an empty/blank cell or a "0." If the isolation of the A vertex pair exceeds the degradation of the F vertex pair then the A vertex pair cell has a valid edge and contain a "1." Within the F vertex pair cell, empty cells or cells containing a zero denote invalid edges (amount of isolation is less than the amount of degradation) and cells containing a "1" denote valid edges (amount of isolation is greater than the amount of degradation).

Figure 8:
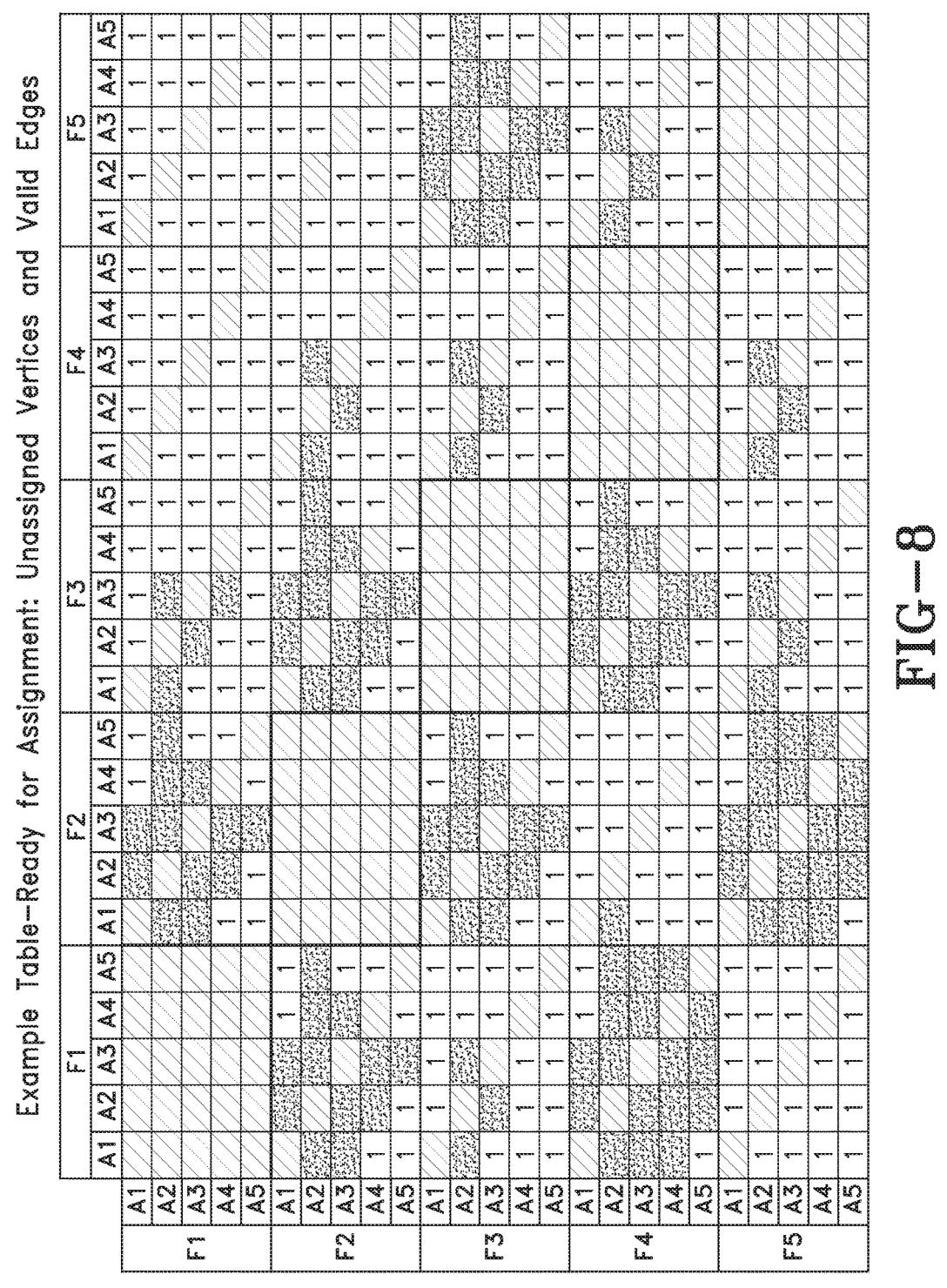

Using the calculations already performed, the matrix showing all possible edge combinations in FIG. 7 is reduced to the matrix edge combinations that are depicted as valid or invalid, shown in FIG. 8. In FIG. 8, valid edges between a vertex pair are represented by a "1" and a blank cell represents an invalid edge. $F_{i,i}$ vertex pairs and $A_{j,j}$ vertex pairs consisting of the same index cannot be paired together and are shown by empty cells in the matrix of FIG. 8. This from Rule #2, which states that a vertex cannot connect to itself.

The best assignment for the example shown in FIG. 8 contains 3 empty cells which represent 3 invalid edge connections. There are two different assignments that will yield the optimum solution of three empty cells. One of the optimum solutions after assignment is shown in FIG. 9. In FIG. 9, eliminated F-A edges have been blocked out. This is a result from Rule #4, which states that once an edge connects a vertex pair, the two vertices cannot connect to any other vertex.

Referring now to FIG. 9, the highlighted A vertex shows the assignment to the highlighted F vertex. The assignments in FIG. 9 are as follows:
Assignment #1: F1 is assigned to A2 (has one invalid edge condition for F1-F4)
Assignment #2: F2 is assigned to A5 (has one invalid edge condition for F2-F1)
Assignment #3: F3 is assigned to A4 (has one invalid edge condition for F3-F4)
Assignment #4: F4 is assigned to A3
Assignment #5: F5 is assigned to A1.

Figure 10:
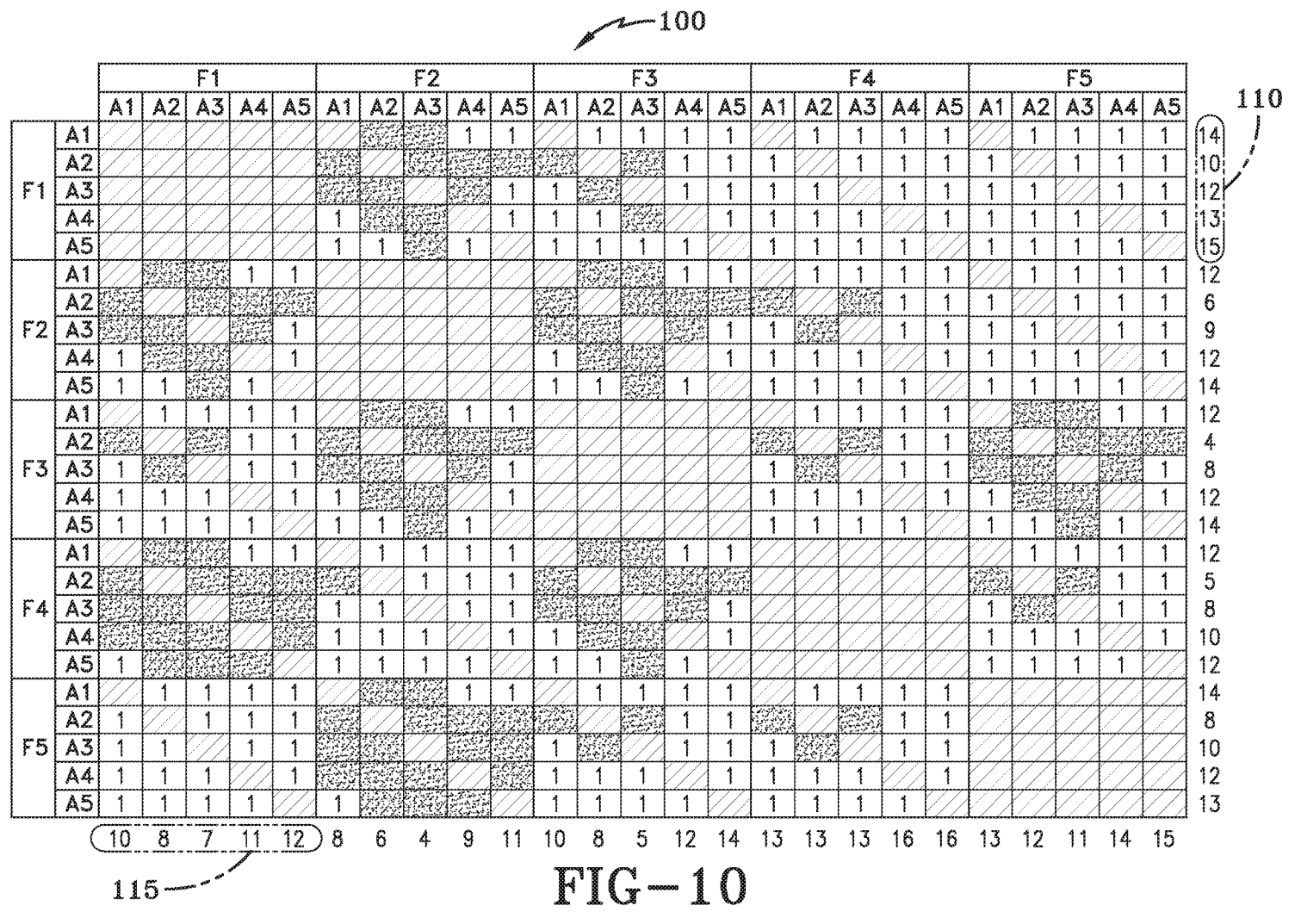
Figure 11:
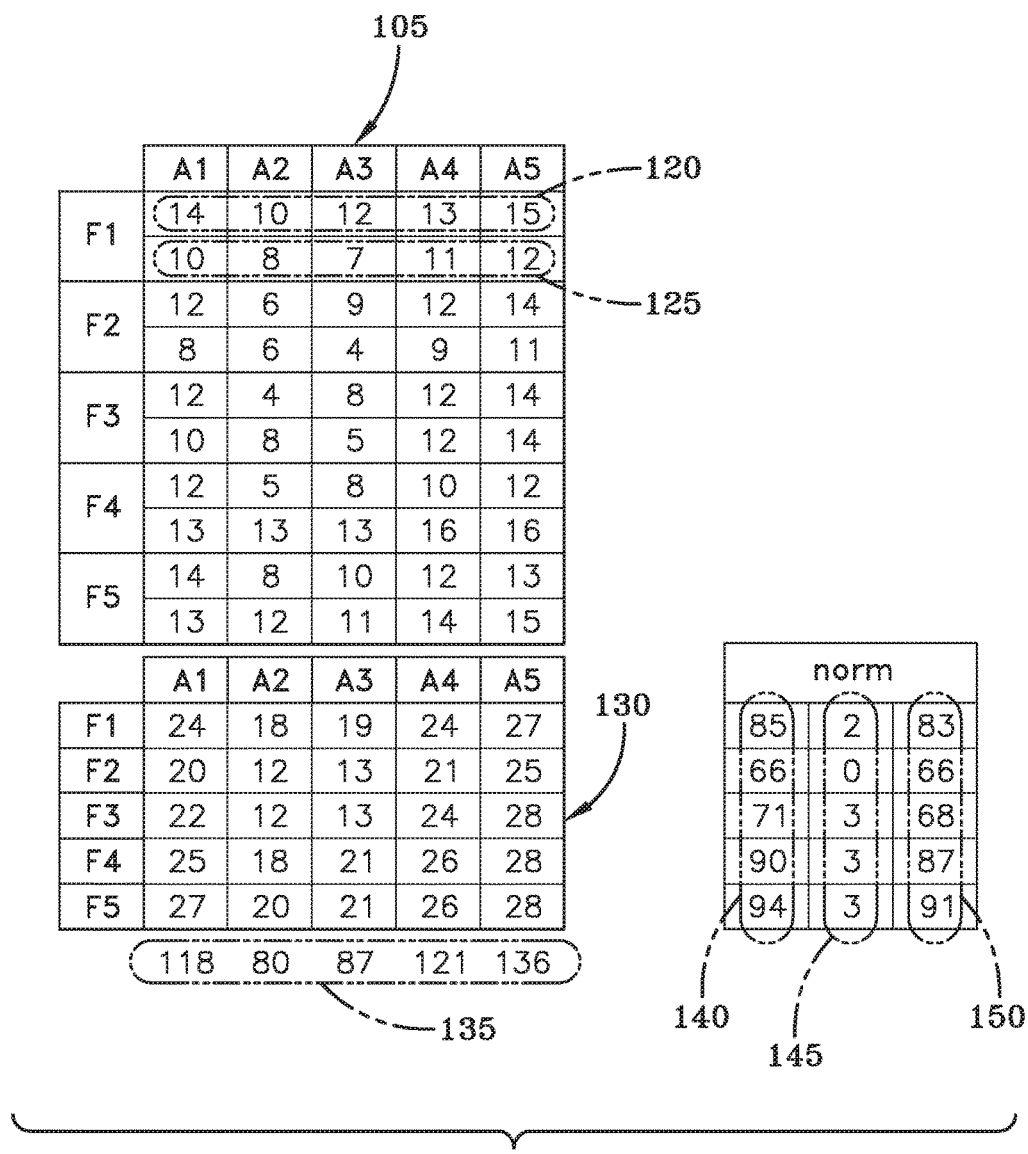
FIG. 11 is a complimentary table to the table in FIG. 10 showing an alternate embodiment of node assignment.

Referring now to FIGS. 10 and 11, an embodiment of the smart antenna method is shown. FIGS. 10 and 11 use the same example as FIG. 8. First, create an $M^2 \times N^2$ matrix [100] which describes the antenna-frequency assignments. Again, these assignments are governed by the rules discussed above with reference to FIG. 5. In the next step, count the number of ones in each row and column. This is shower with the sum of each row [110] to the right of the row on the outside of the matrix [100]. Generate a 2N×M matrix [105] for which the first row [120] is the sum of the rows [110] of the matrix [100] and the second row [125] is the sum of the columns [115]. Table #1 [105] in FIG. 11 is the 2N×M matrix. Next, reduce the 2N×M matrix [105] to an N×M matrix (Table #2) [130] by summing the row and column sums of Table #1, the 2N×M matrix [105]. By way of example, the A1-F1 column of Table #1 [105] is defined by the numbers "14" and "10." The sum of these two numbers is "24," and is shown in the corresponding A1-F1 column of Table #2 [130]. Then, sum each column of the N×M matrix [130]. These sums [135] are shown at the end of each column in Table #2 [130]. Next, find the column with the largest sum. In the example, column A5 of Table #2 [130] has the largest sum. If multiple columns have the same minimum sun, choose the column with the lowest index. Next, sum the rows without including the value from the maximum column (column with the largest sum). Here, the sum of the rows [140] is shown to the right of the Table #2 [130]. Referring to the F1 row of Table #2 [130] the sum of 85 was calculated using the first four numbers (24, 18, 19 and 24) of the row and excluding the largest number 27. Then, normalize the row. This normalization requires calculating the difference between the value in the minimum row and the value in the row for the maximum column. The normalized values [145] are show to the right of the sums [140]. In Table #2 [130], the maximum column is A5, and the minimum value in that row is the number 25. The normalized values [145] are calculated by subtracting 25 from every other value in column A5. Next, subtract the normalized value for each row from the row sum. The results of this step are shown in [150]. As an example, using row F1 in Table #2, the number 2 is subtracted from 85 to arrive at the number 83. Then find the minimum normalized row sum. In Table #2 [130], the minimum normalized row sum is 66 for row F2. If multiple rows have the same minimum sum, choose the row with the maximum in the column to be assigned. Next, assign the frequency associated with the minimum row to the antenna associated with the maximum column. In this example F2 will be assigned to A5. Then zero all the ones in the matrix which are eliminated as a possible assignment by making the preceding assignment. Finally the process can be repeated with a new set of antennas and frequencies.

Although this invention has been described in detail with particular reference to these preferred embodiments, other embodiments can achieve the same results. Variations and modifications of the present invention will be obvious to those skilled in the art and it is the intent of this application to cover, in the appended claims, all such modification and equivalents. The entire disclosure and all references, applications, patents and publications cited above are hereby incorporated by reference.

What is claimed is:

1. A computerized, real-time antenna-frequency mapping method comprising:
   entering radio performance specifications into an electronic library on a computer, wherein the computer comprises:
      a memory; and
      a processor in electronic communication with the memory;
   entering antenna isolation specifications in the electronic library;
   storing the electronic library in an electronic database on the computer;
   entering a list of operating frequencies into a remote interface control, wherein the remote interface control electronically controls and accesses the electronic library and database;
   assigning all possible antenna pairs to frequency pairs;
   determining signal degradation between frequency pairs;
   determining signal isolation between antenna pairs;
   denoting an assignment of an antenna pair to a frequency pair as valid when the signal isolation between the antenna pair is greater than the signal degradation between the frequency pair;
   denoting an assignment of an antenna pair to a frequency pair as invalid when the signal isolation between the antenna pair is less than the signal degradation between the frequency pair;
   maximizing valid antenna pair to frequency pair assignments,
   wherein maximizing valid antenna pair to frequency pair assignments comprises;
   creating a matrix with M rows×M columns and a sub-matrix of N rows×N columns, wherein M represents a number of antenna pairs and N represents a number of frequency pairs;
   denoting each valid assignment of an antenna pair to a frequency pair with a "1" in the matrix;
   summing the 1s in each row and each column of the matrix;
   generating a first table of 2N rows×M columns, wherein each value in the first N row of the 2N rows of the first table is a sum of the 1s in the N×M columns of the matrix and each value in the second row of the 2N rows of the first table is a sum of the 1s in the N×M rows of the matrix;
   generating a second table of 1N row by 1M columns, wherein each value of the 1N row of the second table is a sum of the values in the 2N rows and the values in the 1M columns of the first table;
   summing the values of the 1M columns of the second table;
   choosing a column of the 1M columns, of the second table, with a largest sum value;
   choosing a column, of the 1M columns, of the second table with a lowest value if multiple columns of the 1M columns of the second table have identical largest sum values;
   summing the values in the 1N rows of the second table without including values from the 1M columns of the second table with the largest sum value;
   normalizing, to a minimum value, each of the values in the 1N rows of the 1M columns of the second table with the largest sum value to obtain a value;
   subtracting the normalized value from each row of the 1N rows of the second table from the sum value of each of the 1N rows of the second table to obtain a normalized row sum value for each of the 1N rows of the second table;
   choosing the smallest normalized row sum value of the 1N normalized row value sums of the second table;
   choosing a row, with a higher sum value, of the 1N normalized row sum values when multiple normalized rows have a same smallest sum value;
   assigning frequency pairs associated with the smallest normalized row sum value of the second table to antenna pairs associated with the 1N columns with the largest sum value;
   designating the assigned frequency pair and antenna pair as unavailable for future assignment; and
   repeating the maximizing step; and,
   transmitting the maximized antenna pair to frequency pair assignments to the remote interface control.

2. The method of claim 1, wherein normalizing each of the 1N rows in the 1M column with the largest sum of the second table to obtain a value comprises calculating a difference between the minimum value of the 1M column with the largest sum in the second table and the remaining values in the 1M column with the largest sum in the second table.

3. The method of claim 1, wherein the remote interface control allows remote configuration of radios in communication with a radio frequency tower.

* * * * *